United States Patent
Hofmann et al.

(10) Patent No.: US 12,488,278 B2
(45) Date of Patent: Dec. 2, 2025

(54) INTERACTIVE AGENT AND CONTROL USING REINFORCEMENT LEARNING

(71) Applicant: Microsoft Technology Licensing, LLC, Redmond, WA (US)

(72) Inventors: Katja Hofmann, Cambridge (GB); Luisa Maria Zintgraf, Oxford (GB); Sam Michael Devlin, Trumpington (GB); Kamil Andrzej Ciosek, Cambridge (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 1101 days.

(21) Appl. No.: 17/067,284

(22) Filed: Oct. 9, 2020

(65) Prior Publication Data
US 2022/0114474 A1   Apr. 14, 2022

(51) Int. Cl.
| | | |
|---|---|---|
| *G06N 20/00* | (2019.01) | |
| *G06N 3/006* | (2023.01) | |
| *G06N 3/092* | (2023.01) | |
| *G06N 5/04* | (2023.01) | |
| G06N 3/02 | (2006.01) | |
| G06Q 10/101 | (2023.01) | |

(52) U.S. Cl.
CPC .............. *G06N 20/00* (2019.01); *G06N 3/006* (2013.01); *G06N 3/092* (2023.01); *G06N 5/04* (2013.01); *G06N 3/02* (2013.01); *G06Q 10/101* (2013.01)

(58) Field of Classification Search
None
See application file for complete search history.

(56) References Cited

U.S. PATENT DOCUMENTS

| | | | |
|---|---|---|---|
| 7,921,066 B2 | 4/2011 | Van et al. | |
| 10,809,735 B2 * | 10/2020 | Halder | G05D 1/0088 |
| 2020/0076857 A1 | 3/2020 | Van Seijen et al. | |

FOREIGN PATENT DOCUMENTS

WO   2018212918 A1   11/2018

OTHER PUBLICATIONS

Papoudakis, Georgios, and Stefano V. Albrecht. "Variational autoencoders for opponent modeling in multi-agent systems." arXiv preprint arXiv:2001.10829 (2020). (Year: 2020).*

Feng, Xidong, et al. "Vehicle trajectory prediction using intention-based conditional variational autoencoder." 2019 IEEE Intelligent Transportation Systems Conference (ITSC). IEEE, 2019. (Year: 2019).*

(Continued)

*Primary Examiner* — Daniel T Pellett
(74) *Attorney, Agent, or Firm* — Barta Jones, PLLC

(57) ABSTRACT

In various examples there is a method performed by a computer-implemented agent in an environment. The method comprises storing a reinforcement learning policy for controlling the computer-implemented agent. The method also comprises storing a distribution as a latent representation of a belief of the computer-implemented agent about at least one other agent in the environment. The method involves executing the computer-implemented agent according to the policy conditioned on parameters characterizing the distribution.

20 Claims, 12 Drawing Sheets

(56) References Cited

OTHER PUBLICATIONS

Rosello, Pol, and Mykel J. Kochenderfer. "Multi-agent reinforcement learning for multi-object tracking." Proceedings of the 17th International Conference on Autonomous Agents and MultiAgent Systems. 2018. (Year: 2018).*
Zhao, Shengjia, Jiaming Song, and Stefano Ermon. "Learning hierarchical features from deep generative models." International Conference on Machine Learning. PMLR, 2017. (Year: 2017).*
Krupnik, et al., "Multi Agent Reinforcement Learning with Multi-Step Generative Models", In Repository of arXiv:1901.10251v1, Jan. 29, 2019, 13 Pages.
"International Search Report and Written Opinion Issued in PCT Application No. PCT/US21/043807", Mailed Date: Nov. 12, 2021, 11 Pages.
Zintgraf, et al., "Exploration in Approximate Hyper-State Space for Meta Reinforcement Learning", In Repository of arXiv:2010.01062v1, Oct. 2, 2020, 16 Pages.
Albrecht, et al., "Autonomous agents modelling other agents: A comprehensive survey and open problems", In Journal of Artificial Intelligence, May 1, 2018, 46 Pages.
Albrecht, et al., "Belief and truth in hypothesised behaviours", In Journal of Artificial Intelligence, vol. 235, Jun. 2016, pp. 63-94.
Albrecht, et al., "Reasoning about Hypothetical Agent Behaviours and their Parameters", In Repository of arXiv:1906.11064v1, Jun. 26, 2019, 9 Pages.
Baker, et al., "Modeling human plan recognition using Bayesian theory of mind", In Plan, activity, and intent recognition: Theory and practice, 2014, pp. 177-204.
Baker, et al., "Rational quantitative attribution of beliefs, desires and percepts in human mentalizing", In Journal of Nature Human Behaviour, vol. 1, Issue 4, Mar. 13, 2017, pp. 1-10.
Bard, et al., "Particle filtering for dynamic agent modelling in simplified poker", In Proceedings of the National Conference on Artificial Intelligence, Jul. 22, 2007, pp. 515-521.
Barrett, et al., "Teamwork with Limited Knowledge of Teammates", In Proceedings of Twenty-Seventh AAAI Conference on Artificial Intelligence, Jun. 30, 2013, 7 Pages.
Bergstrom, et al., "On the evolution of behavioral heterogeneity in individuals and populations", In Biology and Philosophy, vol. 13, Issue 2, Apr. 1, 1998, pp. 205-231.
Canaan, et al., "Evaluating the Rainbow DQN Agent in Hanabi with Unseen Partners", In Repository of arXiv:2004.13291v1, Apr. 28, 2020, 8 Pages.
Carmel, et al., "Exploration strategies for model-based learning in multi-agent systems", In Journal of Autonomous Agents and Multi-agent Systems, vol. 2, 1990, pp. 1-38.
Carroll, et al., "On the utility of learning about humans for human-ai coordination", In Advances in Neural Information Processing Systems, Dec. 8, 2019, pp. 1-12.
Chalkiadakis, Georgios, "A Bayesian approach to multiagent reinforcement learning and coalition formation under uncertainty", In Thesis of University of Toronto, Jan. 1, 2007, 258 Pages.
Chalkiadakis, et al., "Cooperative Games with Overlapping Coalitions", In Journal of Artificial Intelligence Research, vol. 39, Sep. 2010, pp. 179-216.
Chalkiadakis, et al., "Coordination in multiagent reinforcement learning: A bayesian approach", In Proceedings of the second international joint conference on Autonomous agents and multiagent systems, Jul. 14, 2003, pp. 709-716.
Zhao, "Learning Hierarchical Features from Deep Generative Models", In International Conference on Machine earning, Jul. 17, 2017, 9 Pages.
Chung, et al., "A recurrent latent variable model for sequential data", In Advances in neural information processing systems, 2015, pp. 1-9.
Duan, et al., "RL2 : Fast Reinforcement Learning via Slow Reinforcement Learning", In Repository of arXiv:1611.02779v2, Nov. 10, 2016, pp. 1-14.

Duff, Michael O'Gordon, "Optimal Learning: Computational procedures for Bayes-adaptive Markov decision processes", In Thesis of University of Massachusetts Amherst, Feb. 2002, 255 Pages.
Foerster, et al., "Bayesian action decoder for deep multi-agent rein415 forcement learning", In Repository of arXiv:1811.01458v1, Nov. 4, 2018, 12 pages.
Haroush,et al. "Neuronal prediction of opponent's behavior during cooperative social interchange in primates", In Journal of Cell, vol. 160, Issue 6, Mar. 2015, pp. 1233-1245.
He, et al., "Opponent modeling in deep reinforcement learning", In International conference on machine learning, Jun. 11, 2016, 10 Pages.
Heap, et al., "Game theory: a critical text", In Publication of Psychology Press, 2004.
Hernandez-Leal, et al., "A Survey of Learning in Multiagent Environments: Dealing with Non-Stationarity", In Repository of arXiv:1707.09183v1, Jul. 28, 2017, pp. 1-64.
Hoang, et al., "A General Framework for Interacting Bayes-Optimally with Self-Interested Agents using Arbitrary Parametric Model and Model Prior", In Repository of arXiv:1304.2024v1, Apr. 7, 2013, 10 Pages.
Joshen, Yedid, "VAIN: Attentional Multi-agent Predictive Modeling", In Proceedings of 31st Conference on Neural Information Processing Systems, Dec. 4, 2017, 11 Pages.
Hu, et al., "Simplified action decoder for deep multi-agent reinforcement learning", In Repository of arXiv:1912.02288v1, Dec. 4, 2019, pp. 1-14.
Humplik, et al., "Meta reinforcement learning as task inference", In Proceedings of arXiv:1905.06424, May 15, 2019, 20 Pages.
Iqbal, et al., "Actor-Attention-Critic for Multi-Agent Reinforcement Learning", In Repository of arXiv:1810.02912v1, Oct. 5, 2018, pp. 1-12.
Ivanovic, et al., "Generative Modeling of Multimodal Multi-Human Behavior", In Proceedings of IEEE/RSJ International Conference on Intelligent Robots and Systems (IROS), Oct. 1, 2018, pp. 3088-3095.
Ivanovic, et al., "The Trajectron: Probabilistic Multi-Agent Trajectory Modeling With Dynamic Spatiotemporal Graphs", In Proceedings of IEEE/CVF International Conference on Computer Vision (ICCV), 2019, pp. 2375-2384.
Kingma, et al., "Auto-encoding variational bayes", In Repository of arXiv:1312.6114v1, Dec. 20, 2013, pp. 1-9.
Kopf, et al., "Partner Approximating Learners (PAL): Simulation-Accelerated Learning with Explicit Partner Modeling in Multi-Agent Domains", In Proceedings of 6th International Conference on Control, Automation and Robotics, Apr. 20, 2020, pp. 746-752.
Nachbar, John H., "Beliefs in repeated games", In Journal of Econometrica, vol. 73, No. 2, Mar. 2005, pp. 459-480.
Nghia, Hoang Trong, "New Advances on Bayesian and Decision-Theoretic Approaches for Interactive Machine Learning", In Thesis of National University of Singapore, Oct. 2014, 223 Pages.
Ortega, et al., "Meta-learning of Sequential Strategies", In Repository of arXiv:1905.03030v2, Jul. 18, 2019, pp. 1-15.
Papoudakis, et al., "Opponent Modelling with Local Information Variational Autoencoders", In Repository of arXiv:2006.09447v1, Jun. 16, 2020, 12 pages.
Papoudakis, et al., "Variational Autoencoders for Opponent Modeling in Multi-Agent Systems", In Repository of arXiv:2001.10829v1, Jan. 29, 2020, 8 Pages.
Zintgraf, et al., "VariBAD: A Very Good Method for Bayes-Adaptive Deep RL via Meta-Learning", In International Conference on Learning Representations, Apr. 26, 2020, pp. 1-20.
Rabinowitz, et al., "Machine theory of mind", In Proceedings of the 35th International Conference on Machine Learning, Jul. 10, 2018, 21 Pages.
Raileanu, et al., "Modeling Others using Oneself in Multi-Agent Reinforcement Learning", In Repository of arXiv:1802.09640v3, Mar. 23, 2018, 11 Pages.
Sadigh, et al., "Information gathering actions over human internal state", In Proceedings of IEEE/RSJ International Conference on Intelligent Robots and Systems, Oct. 9, 2016, 8 Pages.

(56) References Cited

OTHER PUBLICATIONS

Serrino, et al., "Finding friend and foe in multi-agent games", In Proceedings of 33rd Conference on Neural Information Processing Systems, Dec. 8, 2019, pp. 1-11.

Shapley, L. S., "Stochastic games", In Proceedings of the national academy of sciences, Oct. 1, 1953, pp. 1095-1100.

Southey, et al., "Bayes' bluff: Opponent modelling in poker", In Repository of arXiv preprint arXiv:1207.1411, Jul. 4, 2012, 9 Pages.

Stone, et al., "Ad Hoc Autonomous Agent Teams: Collaboration without Pre-Coordination", In Proceedings of the Twenty-Fourth AAAI Conference on Artificial Intelligence, Jul. 11, 2010, pp. 1504-1509.

Tan, Ming, "Multi-agent reinforcement learning: independent vs. cooperative agents", In Publications of Readings in agents, Oct. 1997, 8 Pages.

Wang, et al., "Learning to Reinforcement Learn", In Proceedings of the 39th Annual Meeting of the Cognitive Science Society, Nov. 17, 2016, pp. 1-17.

\* cited by examiner

INTERACTIVE AGENT AND CONTROL USING REINFORCEMENT LEARNING

CROSS-REFERENCE TO RELATED APPLICATION

This non-provisional utility application claims priority to UK patent application number 2015737.6 entitled "INTERACTIVE AGENT" and filed on Oct. 5, 2020 which is incorporated herein its entirety by reference.

BACKGROUND

Agents are physical or digital entities which behave in their environment. A non-exhaustive list of examples of computer-implemented agent is: a self-driving vehicle, an avatar in a video game, a digital assistant (chat bot). Often such computer-implemented agents are trained using machine learning in order to decide how to act within their environment according to a behavior policy.

In some cases the environment itself comprises, in addition to the computer-implemented agent, one or more humans and/or computer-implemented agents. In such cases it is difficult for a computer-implemented agent to achieve its goals because it does not know how the humans and/or other computer-implemented agents will behave.

The embodiments described below are not limited to implementations which solve any or all of the disadvantages of known computer-implemented agents.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a method performed by a computer-implemented agent in an environment. The method comprises storing a reinforcement learning policy for controlling the computer-implemented agent. The method also comprises storing a distribution as a latent representation of a belief of the computer-implemented agent about at least one other agent in the environment. The method involves executing the computer-implemented agent according to the policy conditioned on parameters characterizing the distribution.

In some examples there is a method for training a computer-implemented agent. The method comprises storing a reinforcement learning policy for controlling the computer-implemented agent in an environment. The training method also comprises using a mechanism trainable by gradient descent, jointly learning the policy and a distribution as a latent representation of a belief of the computer-implemented agent about at least one other agent in the environment, such that the policy learns to interpret and make decisions given the distribution over the latent representation.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

The term "computer-implemented agent" refers to an automated agent which is able to act autonomously in its environment according to a policy.

The term "agent" refers to an entity which is able to act autonomously in its environment and which is either human or computer-implemented.

The term "interacting" refers to collaborative or competitive behavior between two or more agents.

Multiple agents that interact or act in the same environment influence each other through their actions: either directly by trying to cooperate, communicate, or compete, or indirectly because they affect the state of the world. To facilitate control of a computer-implemented agent so it is able to achieve a goal efficiently it is useful for such agents to be able to learn about the other agents' strategies, and reason about their behavior. In an example, a computer-implemented player, playing a video game of soccer with a new team requires learning about each player's role and coordinating actions, driving a self-driving car through busy traffic requires anticipating other drivers' moves and reacting to these, and successfully teaching a complex subject to a student requires adjusting the teaching method to their learning style.

Figure 1:
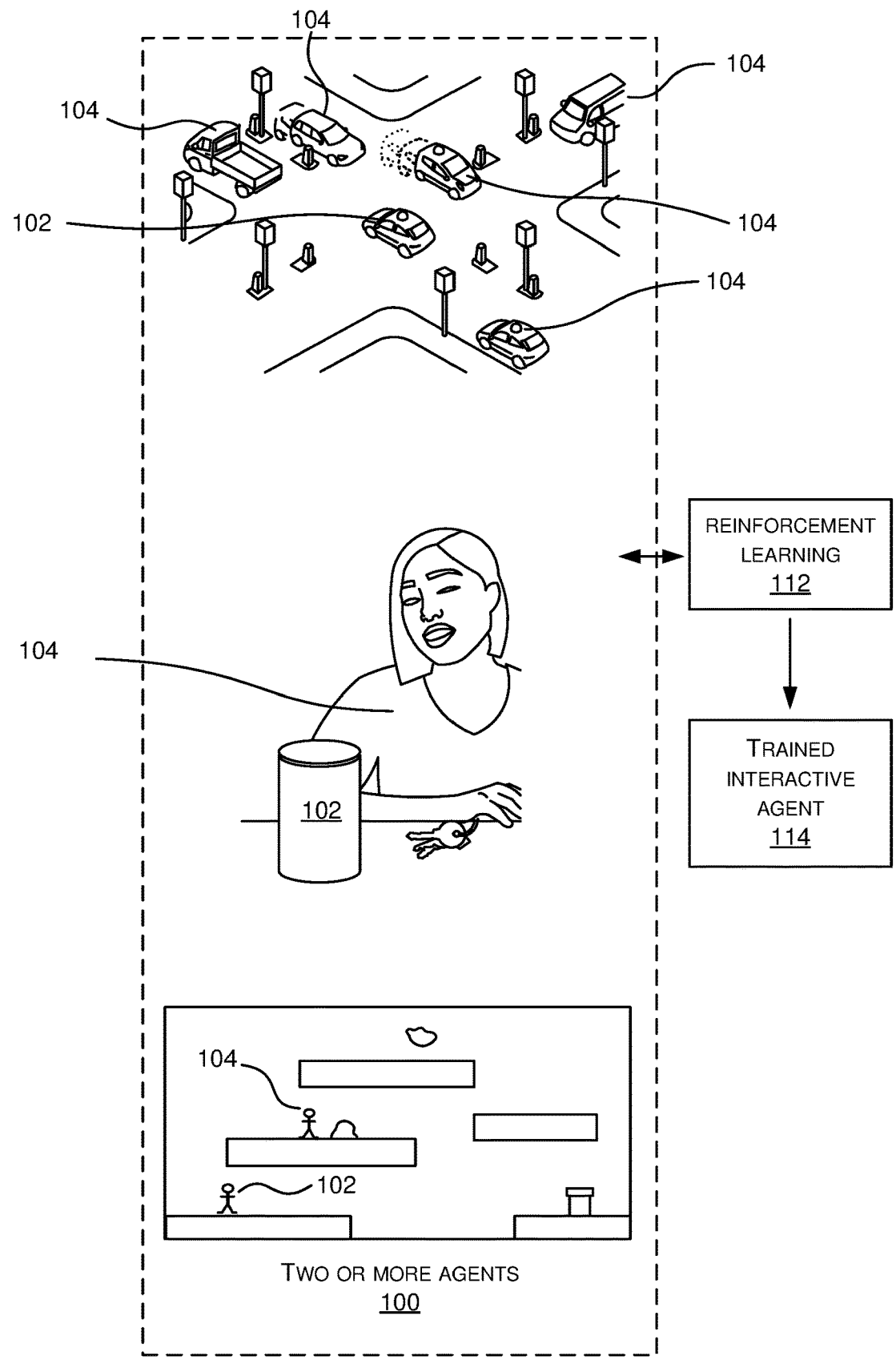
FIG. 1 is a schematic diagram of three different types of interactive agent which are trained using reinforcement learning.

FIG. 1 is a schematic diagram of several examples of two or more agents 100 in an environment. At least one of the agents in each example is a computer-implemented agent 102 and has been trained using reinforcement learning 112 to become a trained interactive agent 114 which is able to interact with other agents in its environment. Once trained the computer-implemented agent 102 is able to take into account behavior of one or more other agents 104 in its environment without predicting actions of those other agents 104. In some examples, actions of the other agents 104 are only predicted as part of the training process which is explained later in this document. The computer-implemented agent 102 has an encoder (which has been learnt during a training phase) which compresses observations into a latent representation modelled as a distribution over its belief about the other agents' behaviors. Using the distribution (which is stored in a trained encoder), the computer-implemented agent 102 is able to adapt to others in an ad hoc way e.g., observe the behavior of other agents 104 and adapt while doing so. The computer-implemented agent 102 does not know the other agents' strategies upfront but begins to observe the other agents' behaviors and continues to observe. In various examples, the observations are global in that they are observations of all other agents in the environment, which gives powerful results as compared with using only local observations of agents proximate to the computer-implemented agent 102. Using the observations, the computer-implemented agent 102 is able to adapt to others by using a behavior policy to control the computer-implemented agent 102 which is conditioned on parameters characterizing the distribution.

In FIG. 1 there is an example where the computer-implemented agent 102 is deployed in a self-driving vehicle which is in an environment with a plurality of other agents 104. The computer implemented agent 102 has a trained interactive agent 114 which enables the self-driving vehicle to be controlled in a manner that takes into account the other agents 104. Initially the self-driving vehicle has little or no knowledge about the behavior of the other agents 104. It observes the behavior of the other agents 104 and uses that to adapt to the encoded latent representation and its reinforcement learning policy.

In FIG. 1 there is an example where the computer-implemented agent 102 is deployed in a digital assistant which interacts with a human which is another agent 104. The digital assistant initially has little or no knowledge about the behavior of the human and observes the behavior of the human over time. The observations are used together with the encoder and a reinforcement learning policy to control the digital assistant.

In FIG. 1 there is an example where the computer-implemented agent 102 is deployed in a computer game apparatus to control an avatar in a game environment comprising another agent 104 which is an avatar controlled by a human player. The computer-implemented agent 102 initially has little or no knowledge about the behavior of the human and observes the behavior of the human over time. The observations are used together with the encoder and a reinforcement learning policy to control the computer-implemented agent 102 avatar.

The examples in FIG. 1 are illustrative and do not limit the scope of the technology. It is understood that the computer-implemented agent 102 is deployable in a wide range of types of apparatus. It is also understood that the computer-implemented agent 102 is operable in environments with two or more other agents 104 where the other agents are computer-implemented, or human, or a mixture of computer-implemented agents 102 and human agents.

The encoder and the policy of the disclosure operate in an unconventional manner to achieve effective control of a computer-implemented agent in an environment comprising one or more other agents.

The encoder and the policy improve the functioning of the underlying computing device by controlling a computer-implemented agent to operate effectively in an environment with other agents of which it initially has little knowledge.

Figure 2:
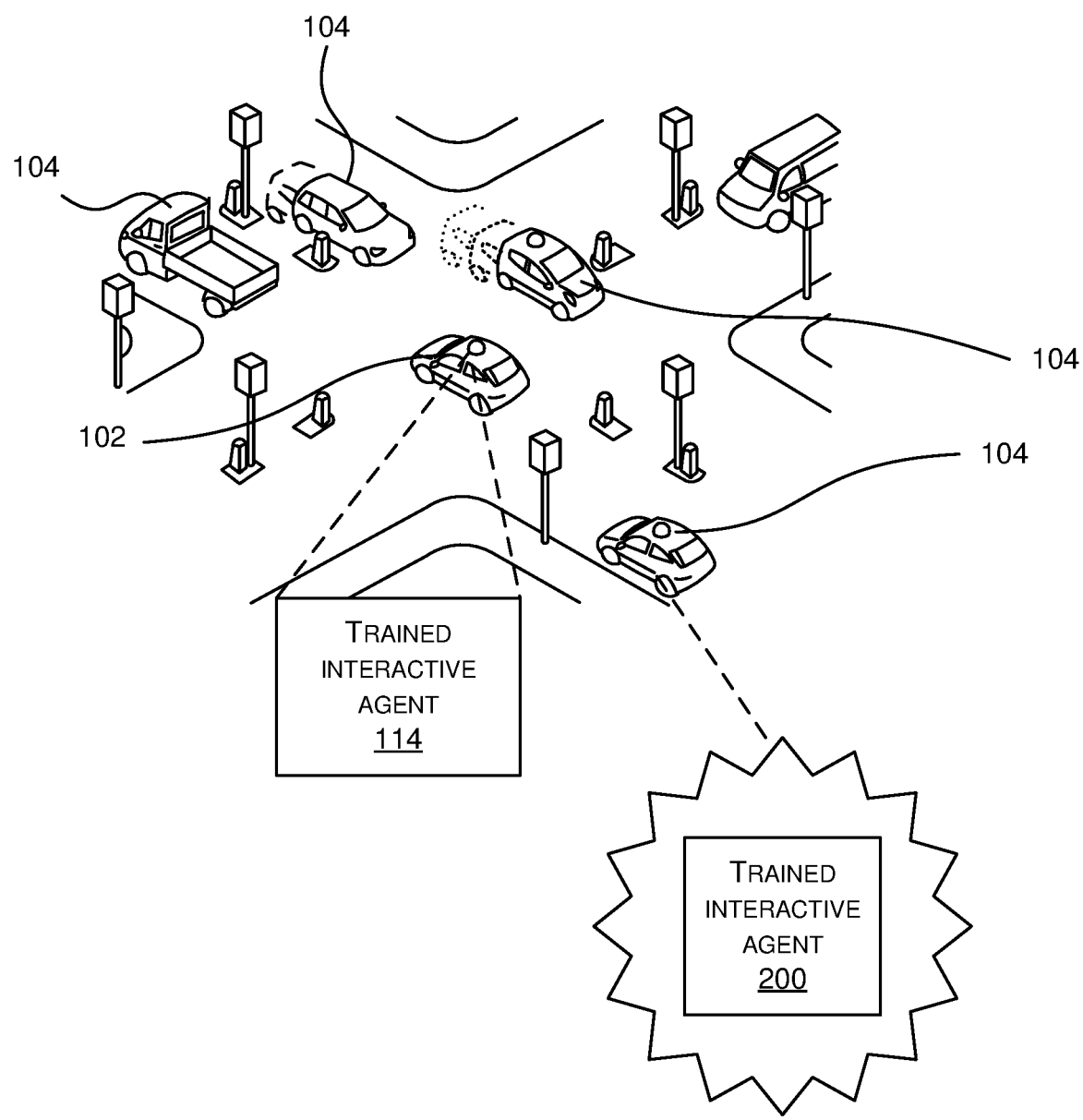
FIG. 2 is a schematic diagram of a traffic junction with several vehicles some of which have trained interactive agent functionality.

FIG. 2 shows the example where the computer-implemented agent 102 is a self-driving vehicle in more detail. The computer-implemented agent 102 is deployed using a trained interactive agent 114 in the self-driving vehicle as part of computer equipment in the self-driving vehicle. In other examples, the computer-implemented agent 102 is deployed as a cloud service accessible by computer equipment in the self-driving vehicle.

The computer-implemented agent 102 is in an environment which is a road junction with five other vehicles present. The other vehicles are other agents 104. Some but not all of the other agents 104 have a trained interactive agent 200; that is, some but not all of the other agents 104 are self-driving vehicles as some are driven by humans. The computer-implemented agent 102 initially has little or no knowledge about the other agents 104. The computer-implemented agent 102 is able to observe the other agents 104 using sensors in the self-driving vehicle and/or by monitoring communications signals sent between the agents 104. The computer-implemented agent 102 is able to monitor its own state using sensors in and on the self-driving vehicle (the domes on the roofs of the vehicles indicate sensors). The state of the computer-implemented agent 102 includes information about current values of one or more parameters of the vehicle such as position, velocity, available fuel, acceleration/deceleration and others.

The computer-implemented agent 102 comprises a behavior policy which has been trained in advance using reinforcement learning, and an encoder which takes as input observations about the other agents and computes a latent representation comprising statistics describing one or more probability distributions. As described in more detail below the policy takes as input a state of the self-driving vehicle and statistics of the latent distribution computed by the encoder given the observations of the other agents 104. Given the inputs, the policy computes an action from a plurality of possible actions. The computed action is then executed by the self-driving vehicle and in this way the self-driving vehicle is controlled. By using the latent distribution the self-driving vehicle is controlled in a way taking into account the other agents 104. In this way the self-driving vehicle is controllable to achieve a goal in an effective and efficient manner since the other agents are taken into account despite not having advance knowledge of the other agents' strategies.

Figure 3:
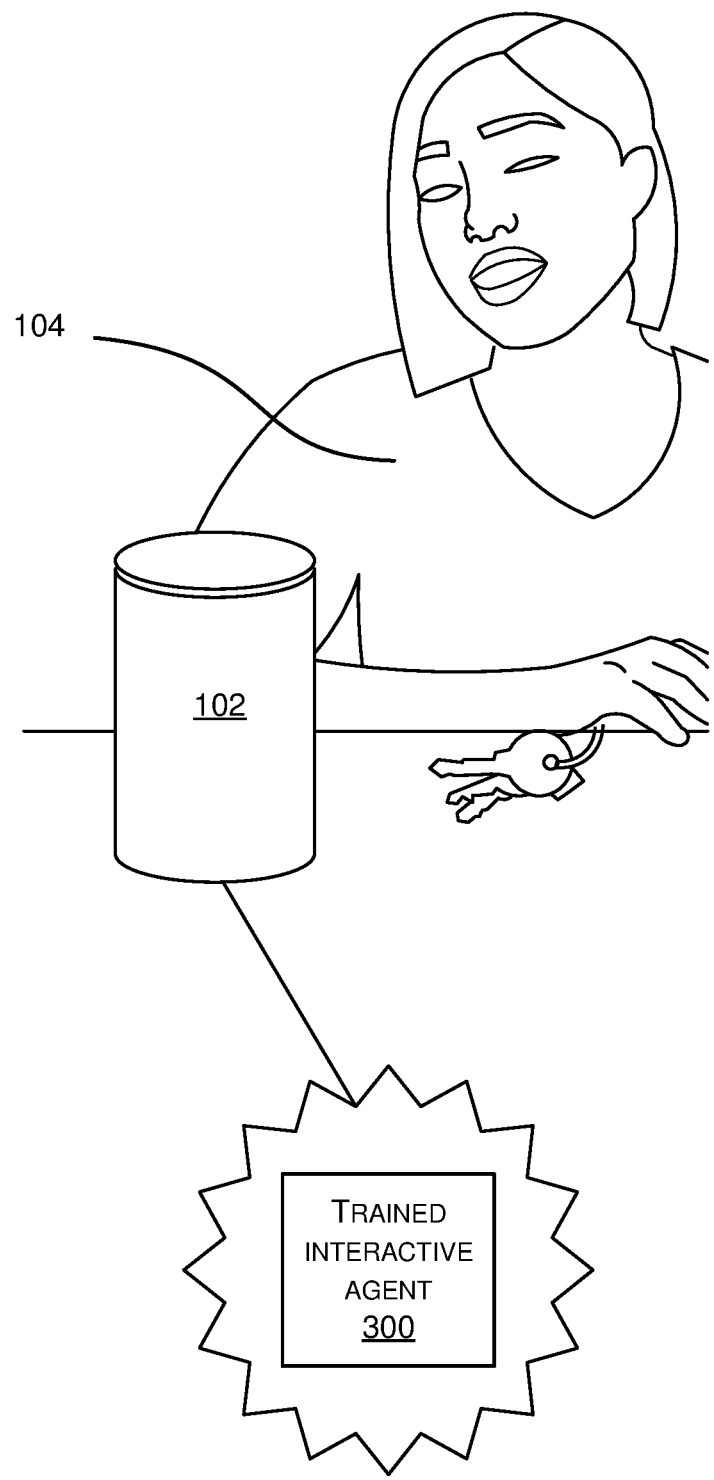
FIG. 3 is a schematic diagram of a woman interacting with a digital assistant which has trained interactive agent functionality.
Figure 4:
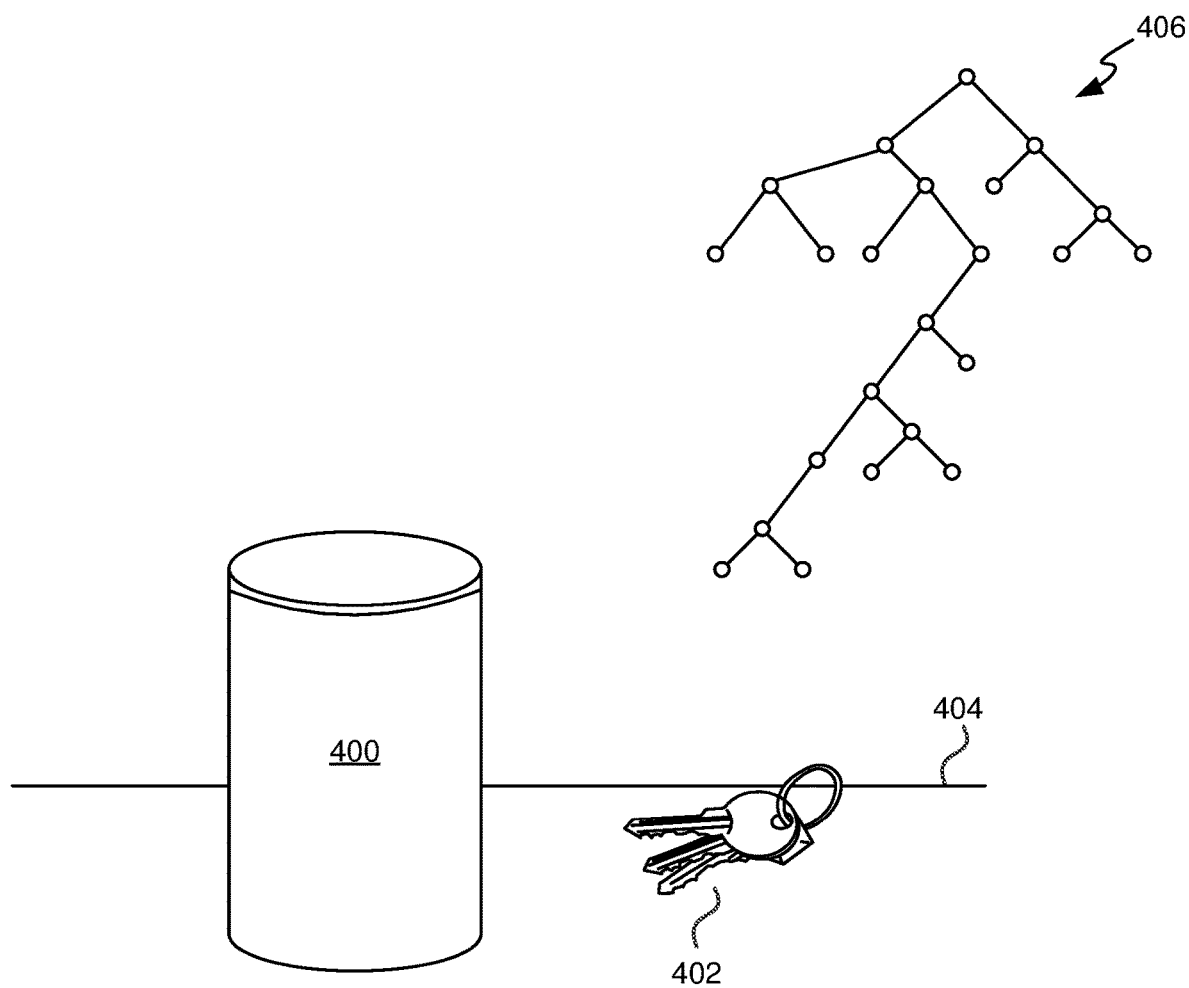
FIG. 4 is a schematic diagram of the digital assistant of FIG. 3 in more detail.

FIG. 3 is a schematic diagram of a human interacting with a digital assistant which has access to a trained interactive agent 300 as a cloud service. In this case the human is the other agent 104 and the digital assistant is the computer-implemented agent 102. The trained interactive agent 300 has no advance knowledge about the behavior of the human user and observes behavior of the human user by receiving spoken input from the human user. FIG. 4 shows the digital assistant of FIG. 3 without the human present for clarity. The digital assistant 400 is on a table 404 of an office. On the table 404 is a set of keys 402 to illustrate the relative size of the digital assistant 400. The digital assistant has a plurality of skills as is well known and has to decide which skill to activate in a particular situation. A non-exhaustive list of example skills is: turn on the lights, turn off the oven, book a restaurant, make a calendar entry.

A decision tree 406 is shown in FIG. 4 and is a schematic representation of a decision tree within software implementing the digital assistant 400 in the cloud. Leaves of the decision tree denote skills of the digital assistant and internal split nodes of the tree denote decision points. The software of the digital assistant searches the decision tree according to the current situation of the digital assistant, including the digital assistant's observations of the human, to find a leaf node which denotes which skill to execute in that situation. Because the digital assistant has no advance knowledge of behavior of the human the decision making is uncertain and likely to be inaccurate in many cases. By using a trained interactive agent to control the digital assistant it is possible to take into account behavior of the human.

The trained interactive agent has a policy and an encoder which have been trained in advance using reinforcement learning. The policy takes as input a state of the digital assistant and statistics of a latent distribution computed by the encoder given the digital assistant's observations of the human Given the inputs the policy computes an action from a plurality of possible actions which are the potential branches of the decision tree at the current split node. The computed action is then executed by the digital assistant.

Figure 5:
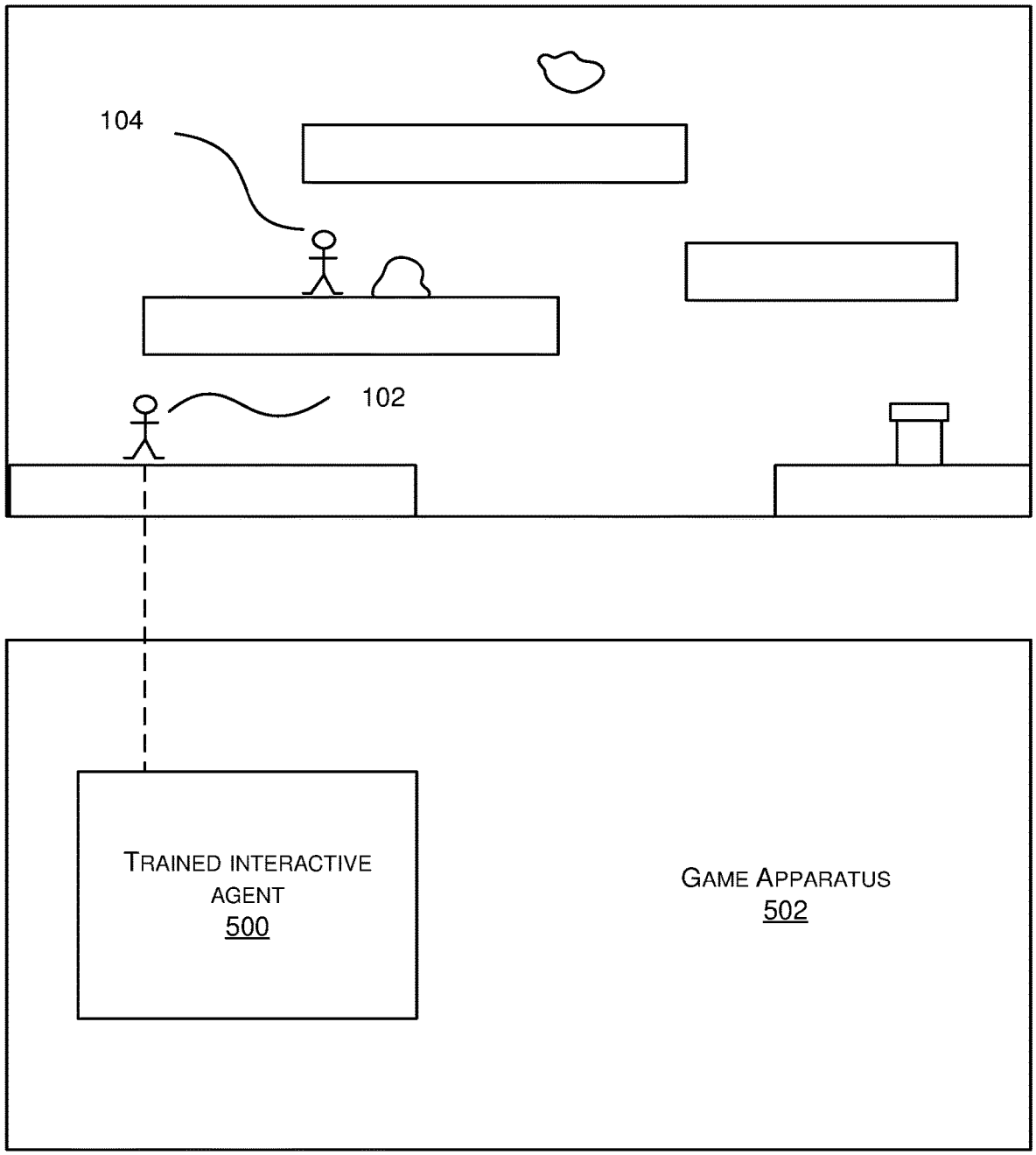
FIG. 5 is a schematic diagram of an avatar in a digital game, the avatar controlled by a trained interactive agent in a game apparatus.

FIG. 5 is a schematic diagram of game apparatus 502 which executes a video game giving a display such as the 2D platformer game display shown in FIG. 5. The game apparatus 502 controls an avatar which is a computer-implemented agent 102 player of the game and a human player controls a second avatar such that the human player is another agent 104 in this case. The players are able to compete or collaborate. The game apparatus 502 is computer-implemented and comprises a trained interactive agent 500. Many of the components of the game apparatus 502 are omitted for clarity and are described below with reference to FIG. 12. The trained interactive agent 500 controls the avatar in order to play the game. The avatar is able to take one of a plurality of specified actions at a given point in the game such as move left, move right, move up, move down.

The trained interactive agent 500 comprises a behavior policy which has been trained in advance using reinforcement learning and is used to decide which action computer-implemented agent 102 avatar will take. The trained interactive agent 500 also comprises an encoder which takes as input observations about the other agent 104 (which in this case is the avatar controlled by the human player) and computes a latent representation comprising statistics describing one or more probability distributions. The latent representation represents a belief the trained interactive agent 500 has about behavior of the human player.

As described in more detail below, the policy takes as input a state of the computer-implemented agent 102 and statistics of the latent distribution computed by the encoder given the observations of the other agent 104. Given the inputs, the policy computes an action from a plurality of possible actions. The computed action is then executed by the game apparatus to control the computer-implemented agent 102 avatar and in this way the game is controlled. By using the latent distribution the avatar is controlled in a way taking into account the other agent 104. In this way the avatar is controllable to achieve a goal in an effective and efficient manner since the other agent 104 is taken into account despite not having advance knowledge of the other agents' strategy.

Figure 6:
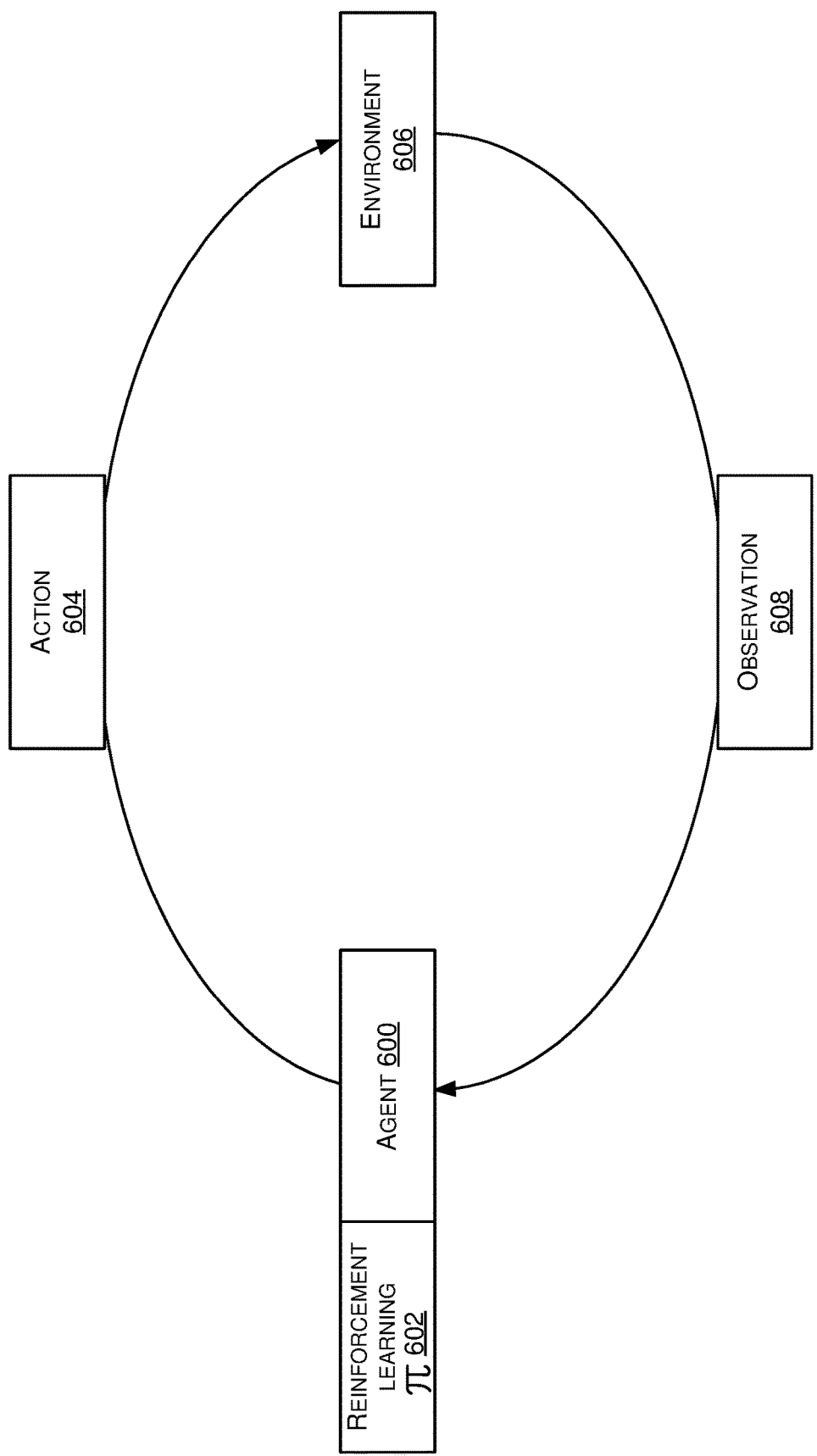
FIG. 6 is a schematic diagram of a reinforcement learning cycle.

FIG. 6 is a schematic diagram of a reinforcement learning cycle. FIG. 6 shows a computer-implemented agent 600 having a reinforcement learning component 602. The computer-implemented agent 600 has a behavior policy denoted using the symbol 7E in FIG. 6 for clarity. The computer-implemented agent 600 is a self-driving vehicle, or a digital assistant, or an automated game player, or any other computer-implemented agent.

When the computer-implemented agent 600 executes in its environment 606, which comprises one or more other agents, it carries out an action 604. Before the computer-implemented agent 600 is first deployed in the environment 606 the behavior policy is trained together with an encoder as described in more detail with reference to FIG. 10. What action 604 to execute is computed from the behavior policy by the computer-implemented agent 600 according to its current observation 608 of its own state and according to a latent representation computed by an encoder using observations made by the computer-implemented agent 600 of one or more other agents in the environment. The action 604 occurs in the environment 606 and may change the environment 606 including the one or more other agents.

Figure 7:
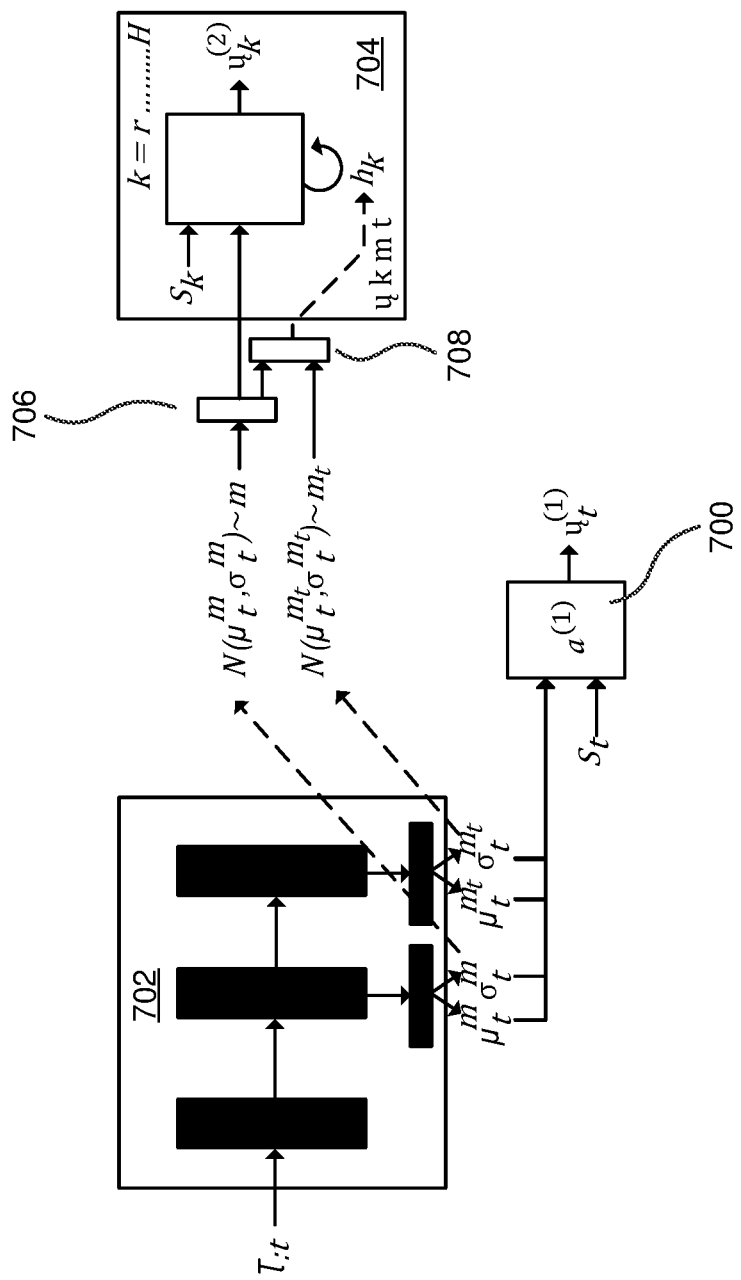
FIG. 7 is a schematic diagram of a variational autoencoder and a policy neural network for training an agent.

FIG. 7 is a schematic diagram of a mechanism for training a computer-implemented agent such as agent 102 of FIG. 1. The mechanism is trainable by gradient descent. The mechanism is used to jointly learn a behavior policy 700 of the computer-implemented agent and a latent representation of other agents in the environment used by the computer-implemented agent. The behavior policy, referred to as a policy, is implemented using a neural network and is indicated using reference number 700 in FIG. 7. As shown in FIG. 7 the mechanism comprises an encoder 702 and a predictive component 704. In some examples, the encoder 702 and predictive component 704 are trained using the same loss function. The loss function computes a measure of a difference between an observed future trajectory of the computer-implemented agent and a prediction of the future trajectory computed using the predictive component. The policy is either trained separately using a reinforcement learning loss, or is trained together with the encoder 702 and the predictive component 704 using a combined reinforcement learning and predictive loss as explained later in this document.

In the example shown in FIG. 7, the predictive component 704 predicts future states.

The arrangement of FIG. 7 is modified in some examples so that the encoder 702 and the predictive component 704 are a variational autoencoder. However, it is not essential to use a variational autoencoder since other types of encoder and predictive component are used in some examples.

The predictive component takes as input a latent representation computed using the encoder 702. In some cases the latent representation comprises two components 706, 708. In that case, the encoder computes two outputs (two distributions) for each other agent, one being a permanent component denoting permanent behaviors of the other agent and the other being a temporal component denoting temporal behaviors of the other agent. Using the two components gives scalability since these two components are computable in parallel at inference time, such as during the process of FIG. 9. Scalability is useful where the number of other agents in the environment is more than one.

However, it is not essential to have the latent representation factorized into two components 706, 708 since workable results are obtained where the latent representation is a single distribution.

The encoder computes a latent representation which represents global belief of the computer-implemented agent. Computing global belief gives the benefit that the encoder is usable to compute latent representations from inputs of observations made by the computer-implemented agent of any of the other agents in the environment. In this way a single encoder is usable to compute latent representations expressing belief, held by the computer-implemented agent, about behavior of different ones of the other agents. The result is a compact and efficient encoder for deployment in a computer-implemented agent. In contrast, alternative approaches which use local belief, whereby an encoder computes belief about only other agents proximate to the computer-implemented agent are more limited in what they can infer about other agents. As a result, approaches which use local belief only produce less accurate predictions which leads to reduced performance of the resultant policy.

Figure 8:
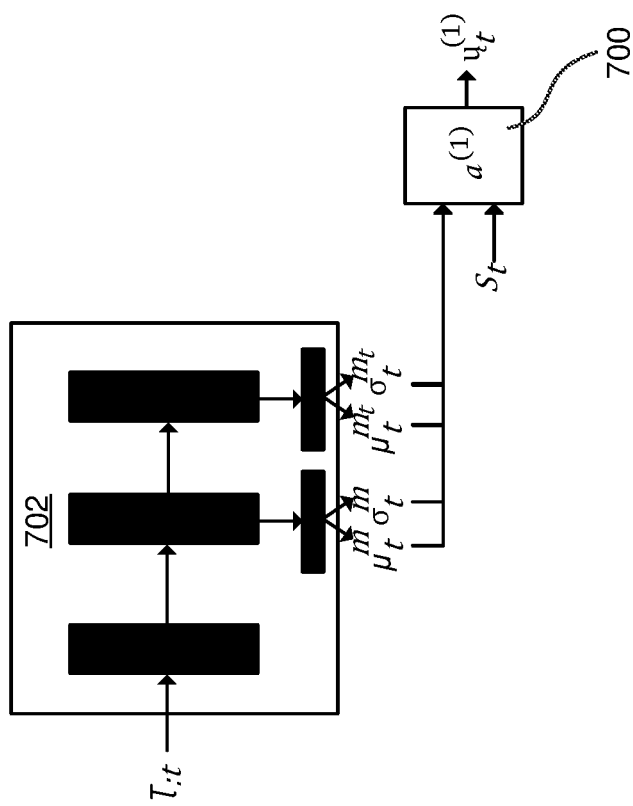
FIG. 8 is a schematic diagram of an encoder and a policy neural network for use in an agent.

FIG. 8 is a schematic diagram of the mechanism of FIG. 7 after training. It is seen that the predictive component 704 is discarded since it is not used after training is complete. The trained encoder 702 and policy 700 are deployed at a computer-implemented agent 102 and/or implemented as a cloud service.

Alternatively, or in addition, the functionality of the trained encoder and policy described herein, and the predictive component is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 9:
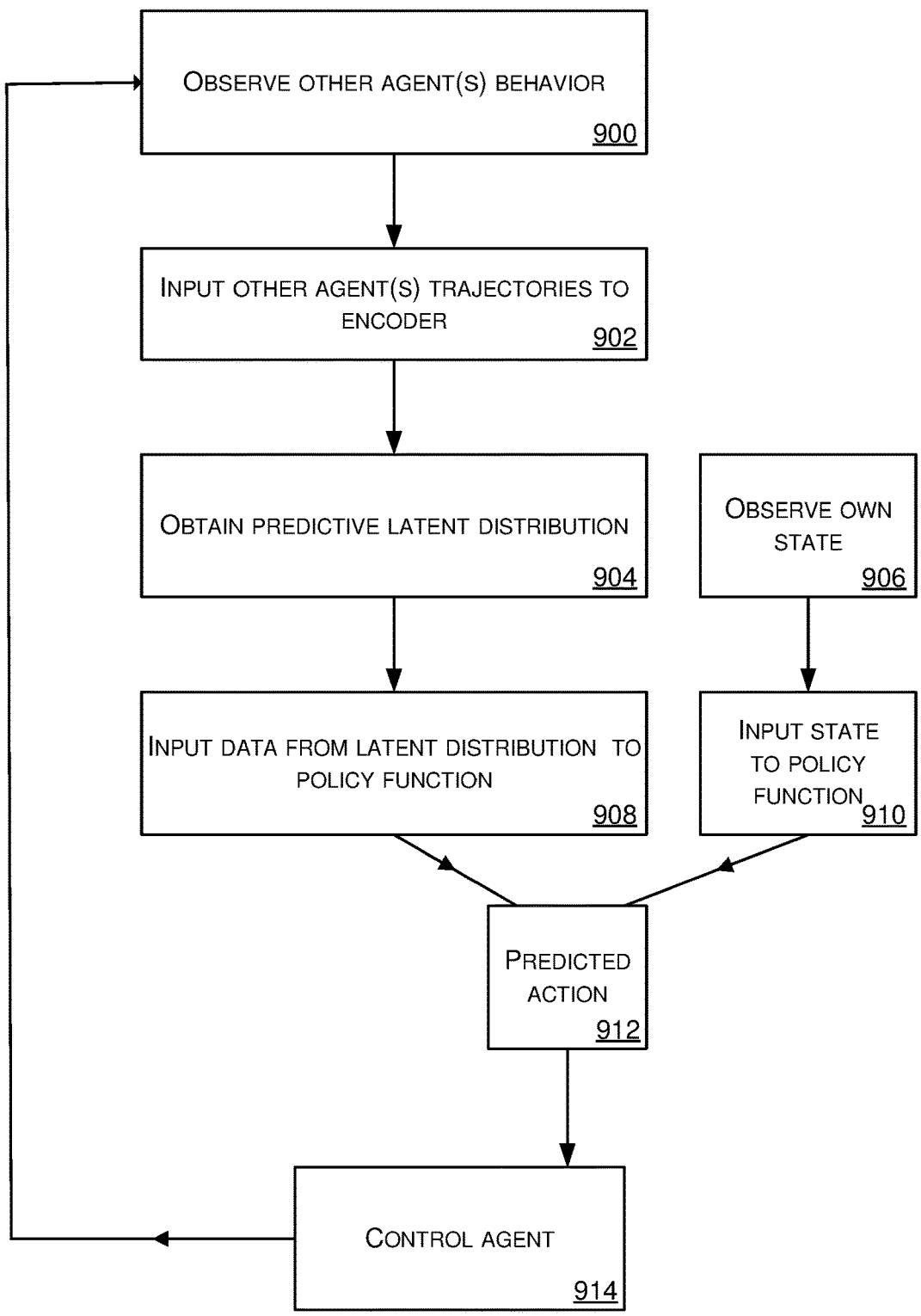
FIG. 9 is a flow diagram of a method of controlling an agent.

FIG. 9 is a flow diagram of a method performed by a computer-implemented agent which has already been trained. The computer-implemented agent observes 900 behavior of one or more other agents 104 in the environment. The observations are made using sensors at the computer-implemented agent and/or by receiving status update messages from the other agents 104. The observations comprise, for each other agent, a trajectory. A trajectory is an ordered sequence of observations of an agent. The one or more trajectories are input 902 to a trained encoder such as encoder 702 of FIG. 8. The encoder computes from the input a predictive latent distribution 904. The predictive latent distribution represents belief of the computer-implemented agent about the other agent(s). The predictive latent distribution does not explicitly predict next actions of the other agent(s).

The computer-implemented agent observes 906 its own state and inputs its own state 910 to a policy function together with 908 data from the predictive latent distribution. The policy function computes, from the inputs, a predicted action 912 and the computer-implemented agent is controlled 914 by executing the predicted action. The method returns to operation 900 and repeats so as to continue controlling the computer-implemented agent. As the method repeats more observations of the other agents are obtained at operation 902 and the predictive latent distribution 904 changes as a result. In this way the predicted action 912 takes into account the observed behavior of the other agents in the environment even though the strategies of the other agents are initially unknown. Thus, during the training phase (described later) the computer-implemented agent has learnt how to adapt when it observes other agents of which it initially has no knowledge.

Figure 10:
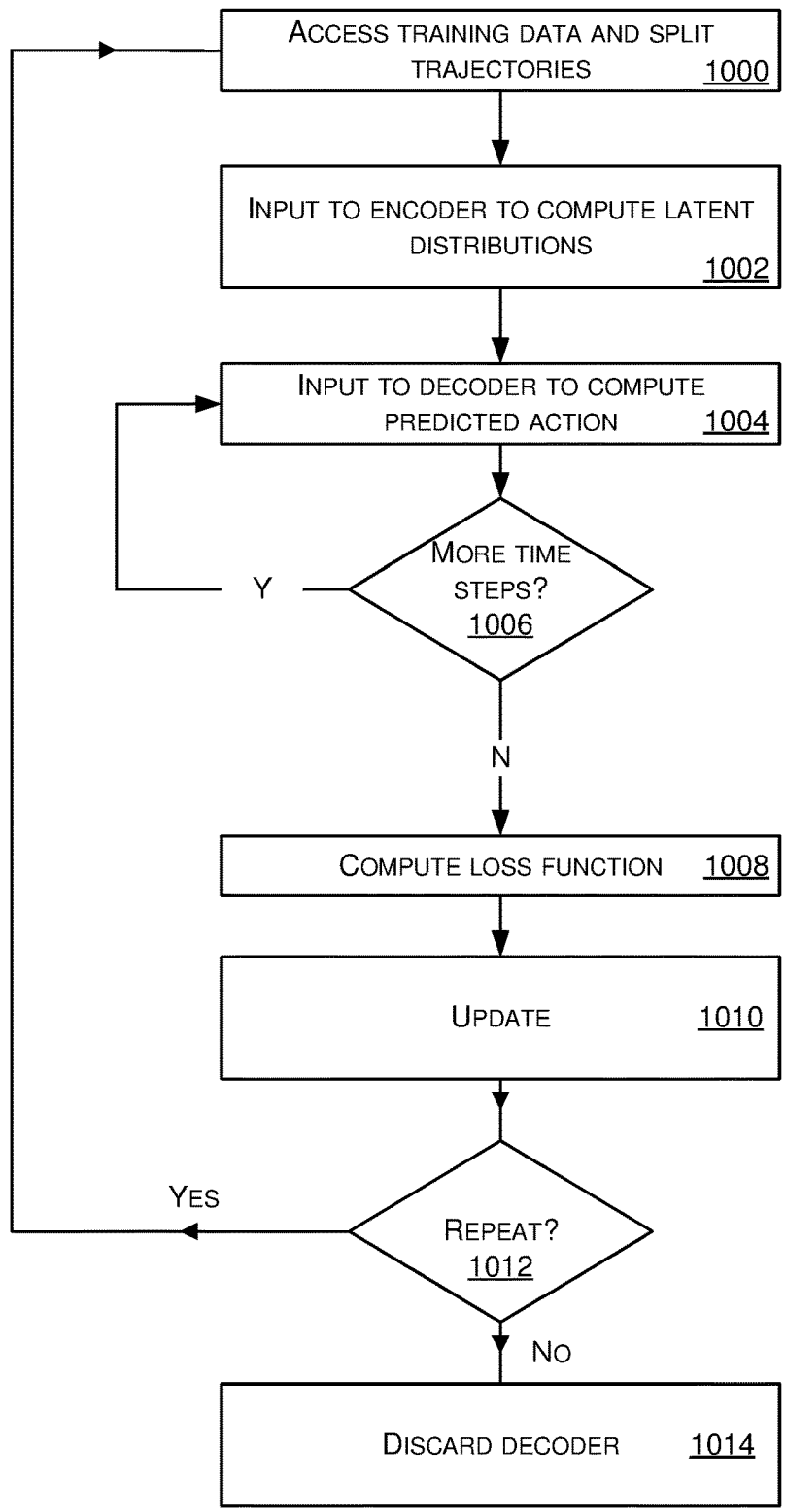
FIG. 10 is a flow diagram of a method of training an agent.

FIG. 10 is a flow diagram of a method performed by a training mechanism (such as that of FIG. 7) in order to train a computer-implemented agent having an encoder and a policy. The method comprises accessing 1000 training data comprising one or more trajectories of the computer-implemented agent acting in the environment comprising one other agent, and splitting the one or more trajectories. A trajectory is split by, for each observation in a trajectory, taking that observation and all previous observations in the trajectory and splitting those observations from the remaining observations which are referred to as a validation part of the trajectory. A trajectory comprises observations, made by the computer-implemented agent, of the behavior of other agents in the environment.

One of the split trajectories is taken and input to the encoder to compute 1002 one or more latent distributions. In an example, the latent distributions are Gaussian distributions each specified using a mean and a standard deviation. The one or more latent distributions represent the computer-implemented agent's belief about behavior of the other agent in the environment. The latent distributions are input to a predictive component, such as a decoder, which computes a predicted action 1004 of the other agent. A check is made as to whether there are more steps 1006 in the validation part of the trajectory. If yes then the method resamples the new current state of the other agent and generates more predicted actions of the other agent from the decoder using operation 1004, one for each of the time steps to reach the end of the trajectory (this is denoted by the plate notation in the FIG. 7) or for a fixed number of timesteps H. Operations 1006 and 1004 repeat until there is a predicted action of the other agent for each of the time steps in the validation part of the trajectory. At that point the validation part of the trajectory is compared with the series of predicted actions of the other agent by computing a loss function 1008. The results of the loss function computation are used to update parameter values of the encoder and the predictive component. In cases where a loss function is used which is a combined reinforcement learning and predictive loss then the policy is also updated using the results of the loss function computation.

A check is made at operation 1012 as to whether to repeat the training process. If there is little change in the parameter values as a result of update operation 1010, or if the training data has been used up, or if a specified number of training iterations have been completed the process moves to operation 1014 where training ends and the decoder or predictive component is discarded. If training is to continue the process returns to operation 1000.

In the case where the environment comprises more than one other agent the method of FIG. 10 is extended. For multiple agents the encoder outputs, at operation 1002, latent distributions for each other agent.

At operation 1004, the decoder is used to make separate predictions of the future actions of each of the other agents. The decoder architecture and parameters are shared for all other agents, but each prediction per agent is only based off of the latent distribution the encoder generates for that agent.

A detailed example is now given using mathematical notation. This example is not intended to limit the scope of the protection but rather to aid understanding of the technology.

The environment contains N agents, defined as a tuple $M=(N, S, U, P_R, \tau, H)$, where $U=U_1 \times \ldots, \times U_N$ is a joint action space, S a shared state space, $P_R(r_t+1|s_t, u_t, s_t+1)$ with a reward function where $r \in \mathbb{R}^N$ and $u_t=(u_1, \ldots, u_N)$ are rewards and joint actions, and $P_T(S_t+1|s_t, u_t)$ are state transition probabilities (for brevity this includes an initial state distribution $P_T(s_o)$). An agent $a^{(i)}$ takes an action $u_t^{(i)} \in \mathcal{U}$ in states $s_t \in S$, and consider stochastic agents such that $a^{(i)}(u_t|\tau_{:t}^{(i)})$ denote action probabilities. Note that an agent can condition its actions not only on the current state, but on the history $\tau_{:t}^{(i)}=(s_o, u_0, r_1^{(i)}, \ldots, s_t)$ with full observability of states and other agents' actions, and a private reward.

A training process learns the policy for agent $a^{(i)}$ even with no control over the other agents $a^{(-1)}=a^{(2)}, \ldots, a^N$ (referred to as other-agent(s)). A prior distribution $P_A^{N-1}(a^{(-1)}) = \Pi_{i=2}^N P_A(a^{(i)})$ over the other-agents is available which it is possible to sample agents independent and identically distributed random variables for meta-training. The other-agents' policies are unknown or unfixed, meaning that simply maximising expected return like in standard reinforcement learning settings, using our agent's reward function $P_R(r_t^{(1)}|s_t, u_t, s_t+1)$ is not workable. The training process operates even where other-agents' policies are initially unknown, and the computer-implemented agent is to learn about the other-agents and maximise its return.

An agent that adapts to initially unknown other-agents optimally is called Bayes-optimal, where the distribution $P_A$ over other-agents is an epistemic belief about the world. Such an agent gathers information about the other-agents if and only if this helps accumulate more rewards in the future, and adapts its strategy conditioned on its belief about the other-agents. In contrast to the Bayes-optimal policy, the optimal policy is generally unobtainable, since this requires knowledge of the other-agents' strategy.

In principle, a Bayes-optimal policy can be computed as now explained. Given a prior belief over the other agent's strategies $P_A^{N-1}$, the objective is to maximise the expected return under uncertainty given this prior distribution, $$\max_{a^{(1)}} \mathbb{E}_{P_A^{N-1}}\left[E_{P_R^a, P_T^a, a}\left[\sum_{t=0}^{H-1} \gamma_{t+1}^{t_{r(1)}}\right]\right] \quad \text{(equation 1)}$$

To this end, the agent maintains a belief about the other agents' strategies, the posterior distribution $p(a^{(-1)}|\tau_{:t})$ where $\tau_{:t}=(s_O, u_0, r_1^{(1)}, \ldots, s_t)$ is the agent's experience until the current time step t. This posterior is updated deterministically at every timestep following Bayes' rule. The agent's actions are now conditioned on so-called hyper-states which are the environment states, together with the current belief. The transition and reward function for the hyper-states can then be defined as $$\mathbb{E}_{p(a^{(-1)}|\tau_{:t})}[P_T(s_{t+1}|s_t, u_t)]\delta(p(a^{(-1)}|\tau_{:t+1})) \text{ and}$$

$$\mathbb{E}_{p(a^{(-1)}|\tau_{:t})}[P_R(r_{t+1}|s_t, u_t, s_{:t+1})]$$

where $\delta$ is the dirac-delta function. To denote that the agent's actions are conditioned on the posterior over other agents' policies, write $b_t = b(\tau_{:t}) = p|\tau_{:t})$ for the current belief, and condition the policy on this belief, $$a^{(1)}(u_t|s_t, b_t) \quad \text{(equation 2)}$$

given a parameterised posterior where the belief $b_t$ is fully characterised by these parameters.

The method for computing a Bayes-optimal policy described above is very powerful, because its solution is the policy that optimally adapts to other agents given some prior belief about their strategies. Unfortunately, computing such a policy is generally intractable for all but the smallest tasks, and existing approximation methods have been restricted to small environments. In the following, there is described a scalable method for computing Bayes-optimal policies using meta-learning.

In an example there is Bayes-Adaptive Interactive Meta Learning (BAIML), a method for learning approximately Bayes-optimal agents that adapt to other agents. In the example, an objective for learning adaptive agents for multi-agent settings is Bayes-optimality.

To model the other-agents, each agent is characterised by its own permanent latent variable (m, also called agent character) and a temporal latent variable ($m_t$, also called mental state). This can be viewed as a probabilistic model:

$$a^{(i)}(u_t|\tau_{:t}) = a(u_t|s_{:t}, m^{(i)}, m_t^{(i)}) \quad \text{(equation 3)}$$

The character m does not change throughout the agent's lifetime. The mental state $m_t$ can change in response to new observations at every timestep and allows to model agents with non-stationary policies, i.e., policies conditioned on the interaction history. An aim of the computer-implemented agent is to learn to interact with other agents, and to maintain beliefs over the other-agents. In an example, the computer-implemented agent infers the posterior $p(m, m_t|\tau_{:t})$ given the agent's experience $\tau_{:t}$ up until the current timestep, where $(m^{(2)}, \ldots m^{(N)})$ and $(m_t^{(2)}, \ldots m_t^{(n)})$.

Recall that the computer-implemented agent's objective is to maximise expected future return (Equation (1)), the expected return given its current belief over the other-agents' policies. During training, the computer-implemented agent predicts other-agents' future behaviour by learning to predict the future actions $p(u_{t:H}^{(i)}|s_t)$ of each other-agent i at every timestep t.

Optimising $p(u_{t:H}|s_t)$ is intractable. Instead, optimise an evidence lower bound (ELBO):

$$\log p(u_{t:H}|s_t) \geq \mathbb{E}_q(m, m_t|\tau_{:t})$$

$$[\log \mathbb{E}_{p(u_{t+H-1}^{(-i)}, s_{t+1:H}|u_t, s_t, m, m_t)}$$
$$[\Pi_{k=t+1}^{H-1}[p(u_k|s_k, m, m_j)]]] \quad \text{(item 4)}$$

$$-KL(q(m, m_t|\tau_{:t})||(q(m, m_t|\tau_{:t-1})) \quad \text{(item 5)}$$

$$= ELBO_t \quad \text{(item 6)}$$

Here, is an intuitive explanation of this objective.

Item (4): At timestep t, given the current posterior $q(m, m_t|\tau_{:t})$, predict the other-agents' future actions $p(u_k|s_k, m, m_k)$ for all future timesteps $k=t$ 1, ... H. Since there is assumed independence between agents, item 4 factorises over the number of other-agents. During meta-training, there is access to these future actions from observations (referred to as collected rollouts). Future actions depend on the mental state $m_k^{(i)}$ for each other-agent i, which changes at each timestep k in the future. Therefore, the model of the other-agent includes a latent variable $m_k$ which evolves over time, for which the encoder outputs the current mental state, $m_t$. In an example the encoder is a neural network with a recurrent architecture although other types of machine learning model are used in other examples.

Item (5): Use a hierarchical latent structure where the agent's temporal state can depend on its permanent type. Use a single latent variable model for this, i.e., do not factorise the posterior distribution. Thus m is generated from early layers in the encoder and $m_t$ from deeper layers. A predictive mechanism is used which, in one example, is a decoder with a reverse hierarchical structure. In an example the prior is set equal to the previous posterior, such that a filtering-type Bayesian update is achieved. This incentivises the posterior distribution to change slowly over time as the computer-implemented agent collects more data.

In an example, represent the posterior using a Gaussian distribution $\mathcal{N}(\mu_t, \sigma_t)$ where $\mu_t = (\mu_t^{m,(2)}, \mu_t^{m_t,(2)}, \ldots, \mu_t^{m,(N)}, \mu_t^{m_t,(N)})$ and $\alpha_t = (\sigma_t^{m,(2)}, \sigma_t^{m_t,(2)}, \ldots, \sigma_t^{m,(N)}, \sigma_t^{m_t,(N)})$. For the prior at the first timestep set $q(m, m_t) = \mathcal{N}(0, 1)$.

Given the approximate posterior $q(m, m_t|\tau_{:t})$, it is sought to approximate Bayes-optimal action selection by conditioning on this belief over the other-agents' policies. In an example, approximate q using a Gaussian distribution $\mathcal{N}(\mu, \sigma)$, and represent the belief using the mean and variance, $b_t = (\mu_t, \sigma_t)$. The policy is then trained using reinforcement learning by conditioning on environment states and beliefs, $a^{(i)}(u_t|s_t, \mu_t, \sigma_t)$. By conditioning on both environment states and beliefs significant benefits are achieved since the computer-implemented agent is able to take into account the other agents in its environment.

In an example deep neural networks are used to represent (1) An encoder $b_\emptyset(\tau_t) = (\mu, \alpha)$ parameterised by $\emptyset$, where the outputs characterise the approximate posterior $q(m, m_t|\tau_{:t}) = \mathcal{N}(m, m_t|\mu, \sigma\Pi)$. In an example, the encoder has a hierarchical structure as shown in FIG. 7 although it is not essential to use a hierarchical structure. In an example, each agent's latent variables $(m, m_t)$ are modelled using a diagonal Gaussian of size $M+M_t$, such that $\mu^{m,(i)}, \sigma^{m,(i)} \in \mathbb{R}^M$ and $\mu^{mt,(i)}, \sigma^{mt,(i)} \in \mathbb{R}^M$. Other formats and types of model are used to represent each agent's latent variables in other examples. (2) A recurrent action decoder for the other agents, $a_\theta^{(i)}(u_t|s_t, m^{(i)}, m_t^{(i)})$, parameterised by $\emptyset$. Note that since there are several other agents, the encoder outputs $\mathcal{N}$ distribution parameters, $\mu = (\mu^{(2)}, \ldots, \mu^{(N)})$ and $\sigma = (\sigma^{(2)}, \ldots, \sigma^{(N)})$, which are independently fed into the same decoder to compute the reconstruction loss. (3) A policy $a_\psi^{(1)}(u_t|s_t, b_t)$, parameterised by $\psi$ and dependent on $\emptyset$ (shorthand $a_{\psi,\phi}^{(1)}$).

Given these, the overall objective of the computer-implemented agent is to maximise the following loss function which combines a reinforcement learning loss and a predictive loss:

$$\mathcal{L}(\phi, \theta, \psi) = \mathbb{E}_{P_A}\left[\mathcal{J}(\psi, \theta) + \lambda \sum_{t=0}^{H-1} ELBO_t(\phi, \theta)\right], \text{ where}$$

$$\mathcal{J}(\psi, \theta) = \mathbb{E}_{P_R^a, P_T^a, a_{\psi,\phi}^{(1)}}\left[\sum_{t=0}^{T} \gamma^t r_t\right].$$

FIG. 7 shows the network architecture, when there is one other agent. In experiments described below the policy is trained using proximal policy optimization (PPO), and without backpropagating the reinforcement learning loss through the encoder. This saves computation without impacting accuracy.

Empirical testing of the embodiment of FIGS. 8 and 9 has been carried out for a situation where the computer-implemented agent controls a game player in a matrix game, referred to as "The game of chickens". The results show improved performance as compared with a similar method but without explicitly modelling the other agents in the environment.

In The Game of Chickens two players play against each other. Imagine two cars driving towards each other: if nobody swerves, they crash and get a penalty (−1); if they both swerve they get a medium reward (1); and if only one of them swerves they are "the chicken" and get a low reward (0) and the other players gets a high reward (8). There are three Tit-4-Tat agents, which cooperate if the computer-implemented agent cooperated once/twice/three times in a row (T4T-1/2/3). Randomly sample an agent to play with for 13 repetitions, which is long enough so that the optimal strategy requires inferring and remembering the opponent's strategy, and short enough to analyse game play. The Bayes-optimal strategy is to cooperate until the other-agent also cooperates and reveals its strategy, after which the other-agent can be exploited by cooperating just until the other-agent will cooperate, and then defecting to get a payoff of 8. The encoder uses a latent dimensionality of 2 each for the permanent and temporal aspects, $m \in \mathbb{R}^2$ and $m_t \in \mathbb{R}^2$.

It was found that BAIML, as well as the similar method but without explicitly modelling the other agents in the environment, both performed better than a feed-forward network conditioned only on the state. In addition, it was found that an ablated version of BAIML using an other-agent model with only the fixed latent m and a feed-forward decoder, performed worse than the embodiment of BAIML although it still gave working results. The worse performance is expected since this cannot model other-agents that condition their actions on the entire history.

The empirical results included values of m at the end of random rollouts which showed a clear separation of agent types where the trained encoder was used as in the embodiment of BAIML. The empirical results included values of the latent variables when there is roll out of the learned policy. It was found that the standard deviation of the learned latent belief is high at the beginning of the episode and goes down as the agent gets more information about the other-agent. The same was found for the temporal latent variable, $m_t$.

Another empirical test was carried out using the Treasure Hunt game which is a gridworld version of an environment designed to be able to easily control the other-agents' strategy. It is a collaborative game with two agents who have to collect coloured coins and bring them to banks. Agents get a small bonus for collecting coins (0.1), a large bonus for dropping it at the correctly coloured bank (1), and a penalty for dropping it at the wrong bank (−1). Coins re-spawn at random locations after being dropped at a bank. There were hard-coded 3 different other-agents: two that only collect coins of one colour (unless the agent accidentally picks up a different-coloured coin, in which case it brings the coin to the correct bank), and an agent which alternates between colours. If no coin of the preferred colour is available, it does nothing and waits. To maximise return it is therefore beneficial to identify which colour the other-agent prefers and focus on the other coins.

An embodiment of the present technology, a similar method (referred to as model-free) but without explicitly modelling the other agents in the environment, and a feed-forward policy (referred to as memory-less), were all trained on the Treasure Hunt game. The results show that the model-free method fails to learn a policy that is better than the memory-less policy. The present technology outperforms both methods by a significant margin.

Experiments were done to test how different adaptation methods behave in environments with many more agents than two, and more diverse agent strategies. It was found that factorising the other-agents' models and explicitly inferring a latent representation $(m, m_t)^{(i)}$ per other-agent i is more helpful the more other-agents are present in the environment. The experiments comprised using the Choose-Least Game which is a competitive game and works as follows: N agents have to each choose one of M possible actions. The agents that chose the action that was chosen least often get a reward of 1, and otherwise 0. Therefore, if an agent can predict what the other-agents will choose, it can get higher rewards. Play this game with 50 repetitions with the same agents (randomly sampled at the beginning), and rewards are given at every timestep. Hard-code the following agents to play against: Iterative (chooses the action with index one larger than its previous one), MyopicMin/OverallMin (chooses the action that was chosen least in the previous round/in all previous rounds), and Stochastic (chooses its favourite action with 25, 50, 75, or 100 percent probability, otherwise a random one). The stochastic agents each have a different favourite action, to simulate other-agents (pre-)coordinating.

It was found that the model-free method deteriorates, up to the point where it is no better than the feed-forward network. The present technology, which learns a model per other-agent, performs well even for a very large number of other-agents. This confirms that the structure of explicitly predicting each of the other-agents' future actions helps especially when the number of other-agents is large.

The present technology gives benefits in video games, making artificial intelligence bots more fun to play with where they adapt to the human player's skill level or play style. Similarly, a recommender system is able to use the present technology to make better suggestions by more rapidly inferring user preferences, and thus better assist humans when making decisions. Self-driving cars are able to use the present technology to perform safely by more accurately predicting the behaviour of other cars, allowing them to react faster and more appropriately. Finally, meta-trained models which can quickly adapt to new settings have the potential of making this technology accessible to people without the resources to build such a system from scratch, or situations where collecting large amounts of data is prohibitive.

Figure 11:
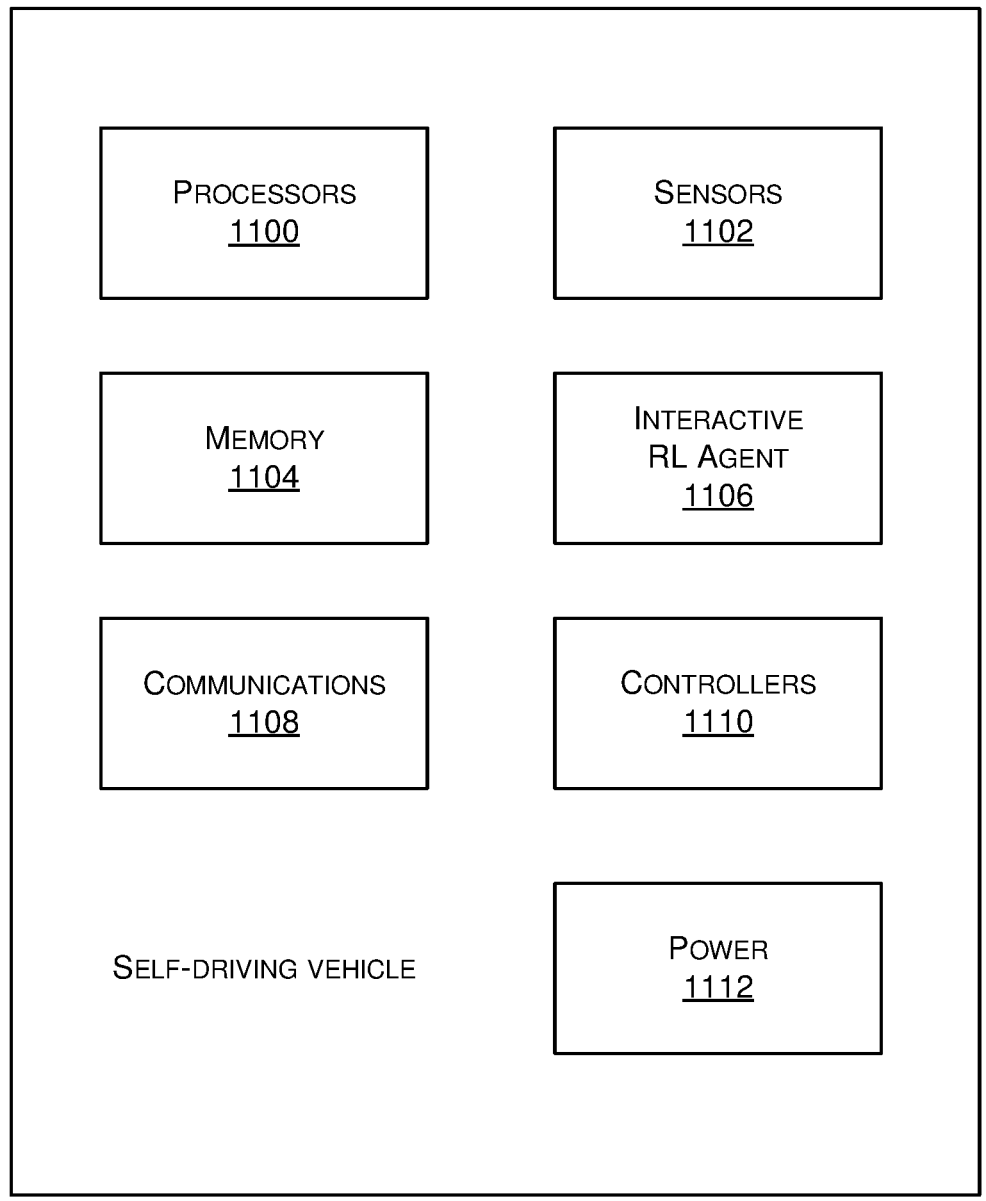
FIG. 11 is a schematic diagram of a self-driving vehicle with an interactive reinforcement learning agent.

FIG. 11 is a schematic diagram of a self-driving vehicle comprising one or more processors 1100, a memory 1104, sensors 1102, an interactive reinforcement learning agent 1106 such as the computer-implemented agent 102 of FIG. 1 and FIG. 2, a communications component 1108, one or more controllers 1110 for controlling the self-driving vehicle and a power component 1112.

Figure 12:
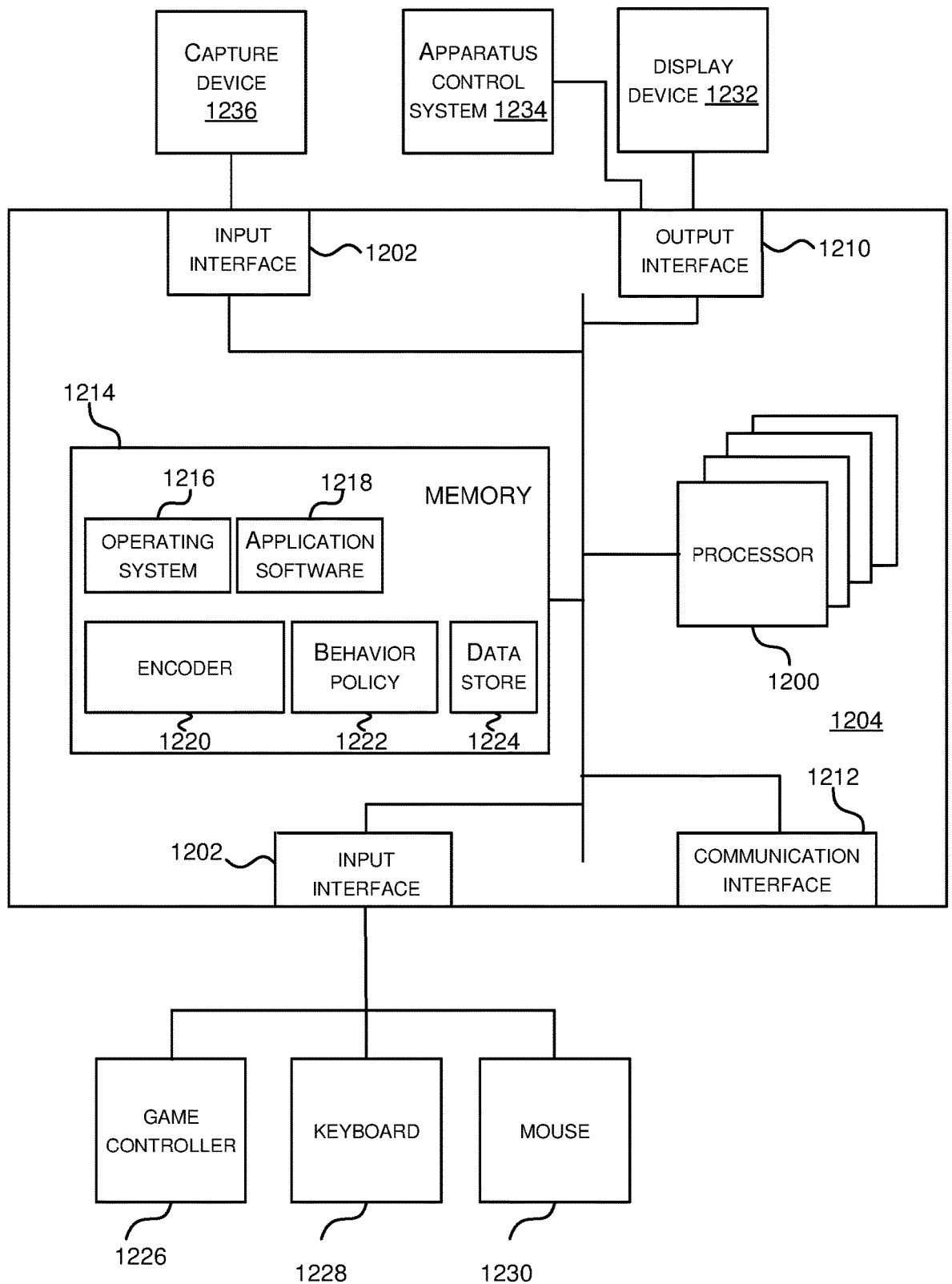
FIG. 12 illustrates an exemplary computing-based device in which embodiments of an agent are implemented.

FIG. 12 illustrates various components of an exemplary computing-based device 1204 which are implemented as any form of a computing and/or electronic device, and in which embodiments of a computer-implemented agent are implemented in some examples.

Computing-based device 1204 comprises one or more processors 1200 which are microprocessors, controllers or any other suitable type of processors for processing computer executable instructions to control the operation of the device in order to execute the agent in an environment comprising one or more other agents according to a behavior policy 1222 and using information derived from a latent distribution computed from an encoder 1220, where the latent distribution represents belief of the computer-implemented agent about behavior of other agents in the environment. In some examples, for example where a system on a chip architecture is used, the processors 1200 include one or more fixed function blocks (also referred to as accelerators) which implement a part of the method of executing the agent and/or training the agent in hardware (rather than software or firmware). Platform software comprising an operating system 1216 or any other suitable platform software is provided at the computing-based device to enable application software 1218 to be executed on the device. A data store 1224 holds observations made by the computer implemented agent about behavior of one or more other agents in the environment.

The computer executable instructions are provided using any computer-readable media that is accessible by computing based device 1204. Computer-readable media includes, for example, computer storage media such as memory 1214 and communications media. Computer storage media, such as memory 1214, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1214) is shown within the computing-based device 1204 it will be appreciated that the storage is, in some examples, distributed or located remotely and accessed via a network or other communication link (e.g. using communication interface 1212).

The computing-based device 1204 also comprises an output interface 1210 arranged to output display information to a display device 1232 which may be separate from or integral to the computing-based device 1204. The output interface 1210 also sends instructions to an apparatus control system 1234 such as vehicle steering, vehicle acceleration and deceleration in the case of a self-driving vehicle, or game control in the case of a computer implemented game player, or selection of tasks in the case of a digital assistant. The display information may provide a graphical user interface. An input interface 1202 is arranged to receive and process input from one or more devices, such as a user input device (e.g. a mouse 1230, keyboard 1228, game controller 1226, capture device 1236, camera, microphone or other sensor). In some examples the user input device detects voice input, user gestures or other user actions and provides a natural user interface (NUI). This user input may be used to input observations of other agents in the environment. In an embodiment the display device 1232 also acts as the user input device if it is a touch sensitive display device.

Alternatively or in addition to the other examples described herein, examples include any combination of the following:

Clause A A method performed by a computer-implemented agent in an environment, the method comprising:
   storing a reinforcement learning policy for controlling the computer-implemented agent;
   storing a distribution as a latent representation of a belief of the computer-implemented agent about at least one other agent in the environment;

executing the computer-implemented agent according to the policy conditioned on parameters characterizing the distribution. By using the distribution as a latent representation, and by conditioning the policy on parameters characterizing the distribution, it is possible to take into account the other agents and so improve performance of the computer-implemented agent.

Clause B The method of clause A wherein the latent representation comprises a permanent component denoting permanent behaviors of the other agent and a temporal component denoting temporal behaviors of the other agent. By having a permanent component and a temporal component particularly good performance is achieved.

Clause C The method of any preceding clause comprising storing the distribution as the latent representation from an encoder having been trained using historical information of the computer-implemented agent's observations of behavior the at least one other agent in the environment. In this way the encoder is able to represent the latent representation in a compact and efficient manner.

Clause D The method of clause C comprising inputting to the encoder a current trajectory of behavior of at least one other agent. The input to the encoder is thus obtainable simply and efficiently.

Clause E The method of any preceding clause comprising observing a state of the computer-implemented agent and inputting the observed state into the policy together with the parameters in order to execute the computer-implemented agent according to the policy conditioned on parameters characterizing the distribution. In this way the computer-implemented agent is executed in a manner to achieve good performance taking into account the other agents.

Clause F The method of any preceding clause wherein the distribution is a Gaussian distribution and the parameters comprise one or more pairs each comprising a mean and a standard deviation. By using a Gaussian distribution and mean and standard deviation it is possible to efficiently represent and manipulate the outputs of the encoder in a digital computer.

Clause G The method of any preceding clause wherein the latent representation comprises a permanent component denoting permanent behaviors of the other agent and a temporal component denoting temporal behaviors of the other agent, and wherein the permanent component is a Gaussian distribution and the temporal component is a Gaussian distribution. Using Gaussian distributions is suited for computation in a digital computer and facilitates computer-implemented operation.

Clause H The method of any preceding clause where the latent representation is of belief of the computer-implemented agent about more than 2 other agents in the environment. In some cases there are up to 50 other agents. A benefit of scalability has been found empirically and is in contrast to alternative approaches which are less scalable.

Clause I The method of any preceding claim wherein the computer-implemented agent is collaborating or competing with the at least one other agent. The present technology is suited for various different types of interaction including collaboration and competition with the other agents.

Clause J The method of any preceding clause comprising jointly learning the policy and the distribution over the latent representation using a mechanism trainable by gradient descent. Using a mechanism trainable by gradient descent gives a workable mechanism suitable for implementation in a digital computer.

Clause K The method of clause J wherein the mechanism comprises an encoder and a predictive component, and wherein the encoder, predictive component and policy are trained using a same loss function. Training using the same loss function is efficient and is found to give good results in practice.

Clause L The method of clause K wherein the loss function computes a measure of a difference between an observed future trajectory of the computer-implemented agent and a prediction of the future trajectory computed using the predictive component. In this way the loss function is practical to compute and yet gives good working results.

Clause M The method of clause J wherein the mechanism is a variational autoencoder. Using a variational autoencoder has been found to work well empirically although in some examples other mechanisms are used.

Clause N The method of any preceding clause wherein the computer-implemented agent is controlled without predicting future actions of the at least one other agent. At inference time this gives the benefit of efficiency since it is not necessary to predict future actions of the other agent in contrast to other methods.

Clause O A computer-implemented agent comprising:
at least one processor;
a memory storing instructions, that, when executed by the at least one processor, perform a method for controlling the computer-implemented agent in an environment, comprising:
computing a latent representation of a belief of the computer-implemented agent about at least one other agent in the environment, the latent representation being a distribution;
executing the computer-implemented agent according to a policy conditioned on parameters characterizing the distribution.

Clause P The computer-implemented agent of clause O deployed as any of: a self-driving vehicle, a physical robot, a computer-implemented game player, a virtual assistant.

Clause Q A computer-implemented method for training a computer-implemented agent, the method comprising:
storing a reinforcement learning policy for controlling the computer-implemented agent in an environment;
using a mechanism trainable by gradient descent, jointly learning the policy and a distribution as a latent representation of a belief of the computer-implemented agent about at least one other agent in the environment, such that the policy learns to interpret and make decisions given the latent representation.

Clause R The method of clause Q wherein the mechanism comprises an encoder, a predictive component and a loss function.

Clause S The method of clause R wherein the loss function computes a measure of a difference between an observed future trajectory of the computer-implemented agent and a prediction of the future trajectory computed using the predictive component, as well as a reinforcement learning loss.

Clause T The method of clause R or clause S wherein the encoder, predictive component and policy are trained using the loss function.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method performed by a computer-implemented agent in an environment, the method comprising:
   storing a reinforcement learning policy for use by the computer-implemented agent to act in the environment;
   storing a distribution as a latent representation of a belief of the computer-implemented agent about another agent in the environment, wherein the latent representation is computed from an input of an observation made by the computer-implemented agent of a behavior of the other agent in the environment, wherein the latent representation comprises a permanent component denoting permanent behaviors of the other agent and a temporal component denoting temporal behaviors of the other agent, and wherein the latent representation includes a hierarchical structure wherein the temporal component of the other agent depends on the permanent component of the other agent, the temporal component being generated from a first layer of an encoder, the permanent component being generated from a second layer of the encoder, wherein the first layer is deeper in the hierarchical structure than the second layer; and
   executing the computer-implemented agent according to the policy conditioned on parameters characterizing the distribution.

2. The method of claim 1 comprising storing the distribution as the latent representation at an encoder having been trained using historical information of the observations of the computer-implemented agent of behavior of the other agent in the environment.

3. The method of claim 2 comprising inputting to the encoder a current trajectory of behavior of the other agent.

4. The method of claim 1 comprising observing a state of the computer-implemented agent and inputting the observed state into the policy together with the parameters in order to execute the computer-implemented agent according to the policy conditioned on parameters characterizing the distribution.

5. The method of claim 1 wherein the distribution is a Gaussian distribution and the parameters comprise one or more pairs each comprising a mean and a standard deviation.

6. The method of claim 1 wherein at least one of the permanent component is a Gaussian distribution or the temporal component is a Gaussian distribution.

7. The method of claim 1 wherein the other agent is a first other agent, and where the latent representation is of belief of the computer-implemented agent about the first other agent and at least second and third other agents in the environment.

8. The method of claim 1 wherein the other agent is a first other agent, and wherein the computer-implemented agent is collaborating or competing with at least one of the first other agent or a second other agent.

9. The method of claim 1 comprising jointly learning the policy and the distribution over the latent representation using a mechanism trainable by gradient descent.

10. The method of claim 9 wherein the mechanism comprises an encoder and a predictive component, and wherein the encoder, predictive component and policy are trained using a same loss function.

11. The method of claim 10 wherein the loss function computes a measure of a difference between an observed future trajectory of the computer-implemented agent and a prediction of the future trajectory computed using the predictive component.

12. The method of claim 9 wherein the mechanism is a variational autoencoder.

13. The method of claim 1 wherein the computer-implemented agent is controlled without predicting future actions of the other agent.

14. The method of claim 1, wherein the temporal component of the other agent comprises a temporal state and the permanent component of the other agent comprises a permanent type.

15. The method of claim 1 wherein the observation of the behavior of the other agent in the environment made by the computer-implemented agent is made by a sensor at the computer-implemented agent.

16. A computer-implemented agent comprising:
a processor;
a memory storing instructions, that, when executed by the processor, cause the computer-implemented agent to perform, in an environment, a method comprising:
computing a latent representation of an inference of the computer-implemented agent about another agent in the environment, the latent representation being computed from an input of an observation made by the computer-implemented agent of a behavior of the other agent in the environment, wherein computing the latent representation comprises factorizing the latent representation into a permanent output and a temporal output, the permanent output comprising a first distribution denoting permanent behaviors of the other agent, the temporal output comprising a second distribution denoting temporal behaviors of the other agent, and wherein the temporal output is generated from a first layer of an encoder, the permanent output is generated from a second layer of the encoder, and the first layer is deeper in a hierarchical structure of the latent representation than the second layer; and
executing the computer-implemented agent according to a policy conditioned on parameters characterizing the first and second distributions.

17. The computer-implemented agent of claim 16 deployed as any of: a self-driving vehicle, a physical robot, a computer-implemented game player, a virtual assistant.

18. A computer-implemented method for training a computer-implemented agent, the method comprising:
storing a reinforcement learning policy for use by the computer-implemented agent to act in an environment; and
using a mechanism trainable by gradient descent, jointly learning the policy and a distribution as a latent representation of a belief of the computer-implemented agent about at least one other agent in the environment, wherein the latent representation is computed from inputs of observations made by the computer-implemented agent of behaviors of all of the other agents in the environment, wherein the latent representation comprises a permanent component denoting permanent behaviors of at least one of the other agents and a temporal component denoting temporal behaviors of at least one of the other agents, and wherein the latent representation includes a hierarchical structure wherein the temporal component of the at least one other agent depends on the permanent component of the at least one other agent, the temporal component being generated from a first layer of an encoder, the permanent component being generated from a second layer of the encoder, wherein the first layer is deeper in the hierarchical structure than the second layer.

19. The method of claim 18 wherein the mechanism comprises an encoder, a predictive component and a loss function.

20. The method of claim 18, wherein the temporal component of the at least one other agent comprises a temporal state and the permanent component of the at least one other agent comprises a permanent type.

* * * * *